July 15, 1958
E. F. WARD
2,843,343
HYDRAULIC IMPULSE CATAPULT AND METHOD FOR LAUNCHING AIRCRAFT
Filed Sept. 26, 1955
3 Sheets-Sheet 1
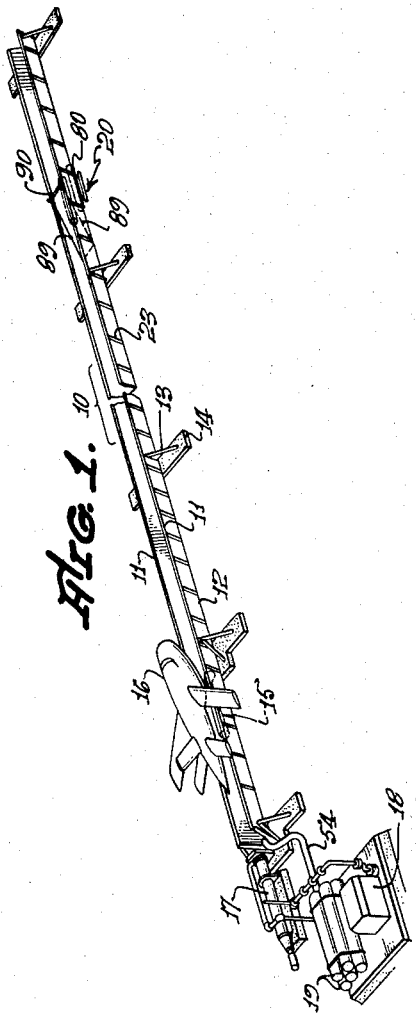
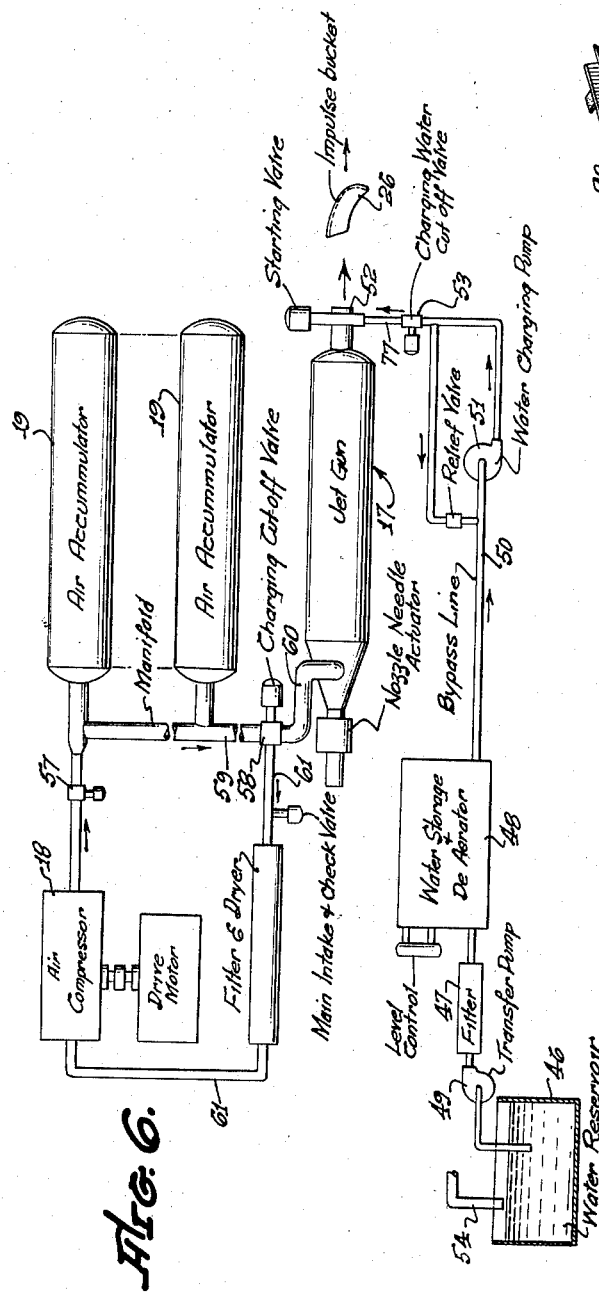
ELMER F. WARD,
INVENTOR.
BY
ATTORNEY.

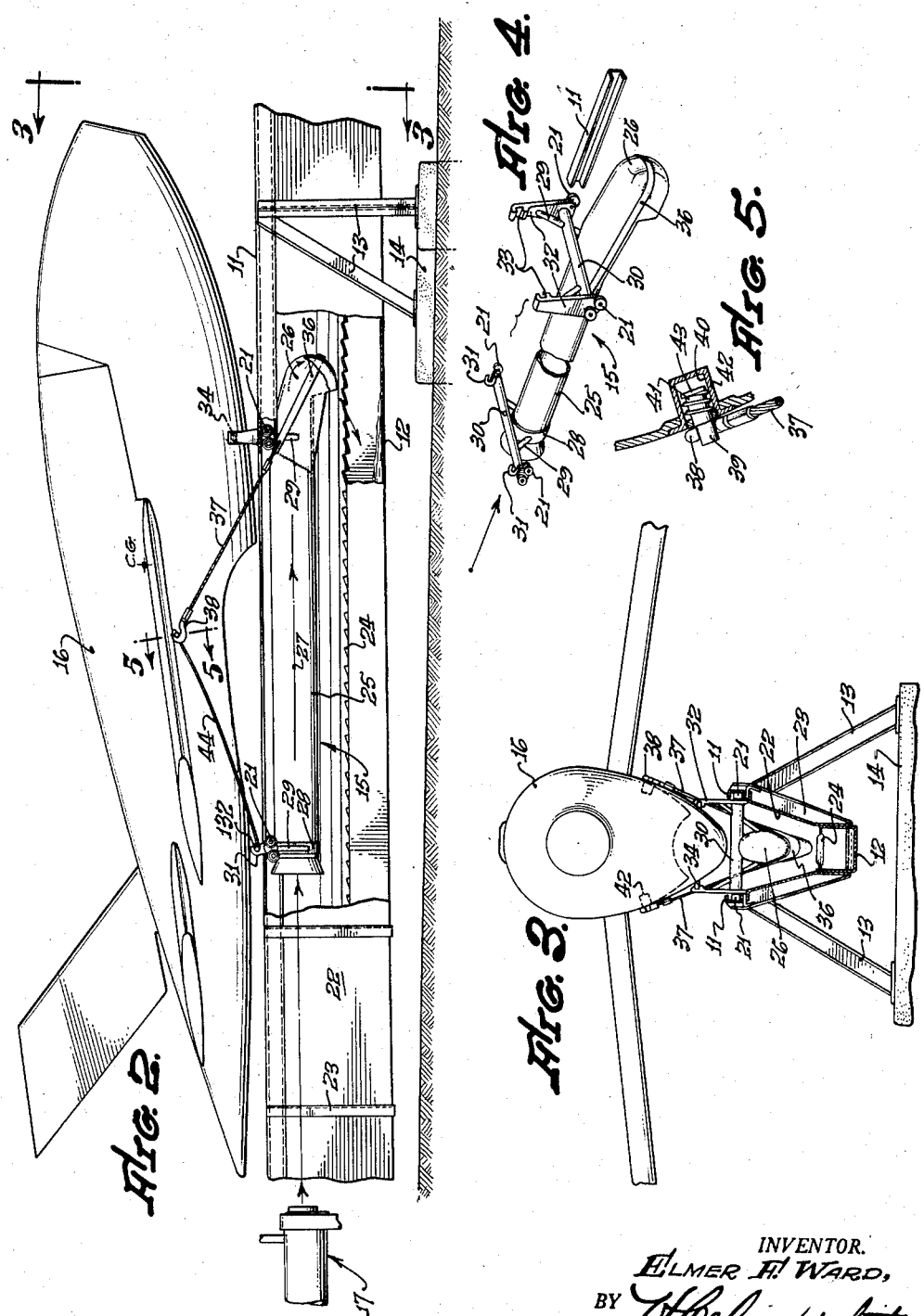

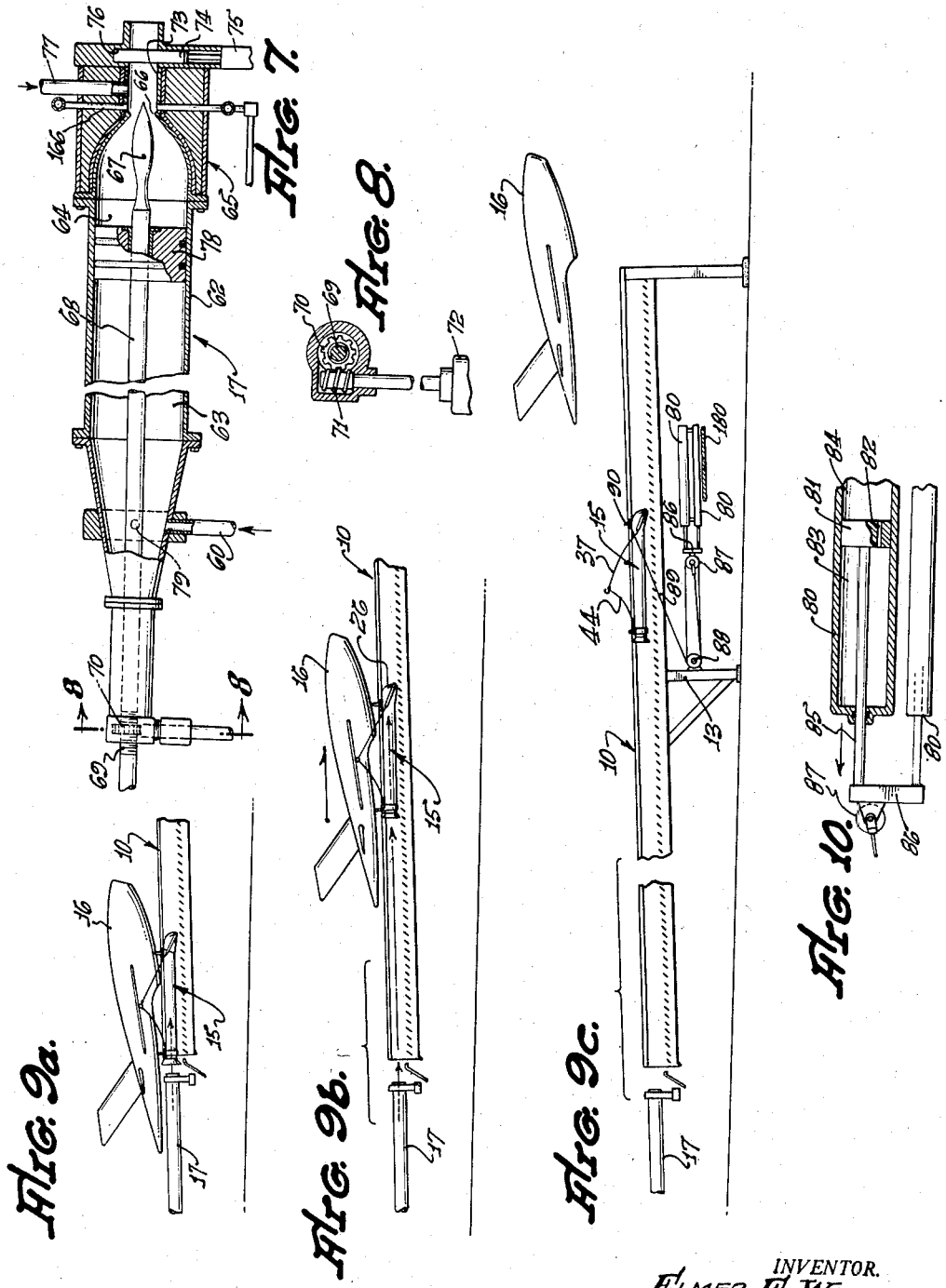

United States Patent Office 2,843,343
Patented July 15, 1958

2,843,343

HYDRAULIC IMPULSE CATAPULT AND METHOD FOR LAUNCHING AIRCRAFT

Elmer F. Ward, Pasadena, Calif., assignor to Task Corporation, Pasadena, Calif., a corporation of California Application September 26, 1955, Serial No. 536,478

14 Claims. (Cl. 244—63)

This invention relates to apparatus and methods for catapulting aircraft, and more particularly has to do with accelerating aircraft to launching velocities by means of the reaction or thrust produced upon impinging of a high velocity hydraulic jet stream against bucket structure connected in thrust transferring relation with the aircraft.

The present invention is characterized as regards its operation by the transfer of very large thrust forces to the aircraft without mechanical connection between the energy source and the aircraft. In the past, some form of mechanical connection between the energy source and the catapulted aircraft was thought necessary in order to secure the desired thrust for launching purposes, various forms of catapulting devices used being predicated in their operation upon such mechanical connections. For example, a type of catapult structure including an elongated expansion cylinder containing a traveling piston having operative connection with an aircraft has been utilized in which rapidly expanded gases produced as by an explosion serve to urge the traveling piston in the launching direction to secure catapulting of the aircraft. Other such devices requiring mechanical connection between the energy source and the catapulted aircraft include jet assisted take-off units which are normally secured to an aircraft and fired to produce jet thrust reacting against the aircraft, giving required acceleration. With the advent of heavily loaded modern aircraft needing some form of thrust assistance in take-off, the problem of providing such assistance has become acute, since known types of catapulting devices are often times subject to faulty operation due to their complexity, and in particular as regards the mechanical connection required between the energy source and the aircraft. Furthermore, such devices as jet assisted take-off units are very expensive and inefficient insofar as realizable thrust is concerned.

In accordance with the present invention, the above mentioned difficulties are obviated by dispensing with any form of mechanical connection between the energy source and the aircraft and providing means for producing a high velocity hydraulic jet stream for impinging against an impulse bucket operatively connected to the aircraft, so that the reaction of the jet stream against the bucket accelerates the aircraft to launching velocity. The invention broadly contemplates the use of an elongated track assembly extending in the launching direction upon which is supported a movable carriage for guided movement in the launching direction. The carriage is connectible with the aircraft for directly transferring launching thrust to it and also supports a hydraulic impulse bucket against which a hydraulic jet stream reacts. The latter is produced by a novel hydraulic jet gun including a nozzle directed toward the bucket and supplied with liquid under high pressure produced by a gas such as compressed air.

Further, and in connection with the production of thrust reaction against the impulse bucket, means are provided for increasing the discharge area of the jet gun nozzle during launching, so as to allow more water to escape through the nozzle and thereby increase the rate of hydraulic jetting to compensate for decreasing reaction against the bucket resulting from its increased velocity away from the jet gun. With this arrangement, the thrust reaction against the bucket may be maintained substantially constant during catapulting of the aircraft to maintain a steadily increasing launching velocity of the aircraft.

Other objects of the invention include the provision of a novel integral track assembly including a water recovery trough positioned beneath a pair of tracks, the movable carriage being engageable with the track over the trough so that water discharging from the impulse bucket is collected by the trough and returned to a reservoir near the jet gun. The invention also contemplates the provision of a novel jet confining tube with an integral impulse bucket at the forward portion of the tube, the latter having a diameter substantially greater than the jet stream diameter. For transferring thrust directly to the aircraft, a tension member such as a cable or strap is mounted directly on the impulse bucket at the forward end of the carriage tube, the tension member also being connectible to the aircraft.

The aforementioned features and objects of the invention as well as additional aspects together with the details of a typical and illustrative embodiment will be understood more fully from the following description of the accompanying drawings, in which:

Fig. 1 is a perspective view of the hydraulic catapulting apparatus;

Fig. 2 is an enlarged elevation, partly in section, showing a portion of the track assembly together with an aircraft;

Fig. 3 is a view taken on line 3—3 of Fig. 2;

Fig. 4 is a perspective view of the carriage assembly illustrated in Fig. 2;

Fig. 5 is an enlarged section taken on line 5—5 of Fig. 2;

Fig. 6 is a schematic flow diagram illustrating the air and water supply system for the jet gun;

Fig. 7 is an enlarged sectional view taken through the jet gun;

Fig. 8 is a section taken on line 8—8 of Fig. 7;

Figs. 9a, 9b and 9c illustrate a catapulting operation sequence; and

Fig. 10 is an enlarged sectional view showing the braking mechanism for the carriage assembly.

Referring first to Fig. 1, in which the catapulting apparatus is shown prepared for launching an aircraft, there is illustrated a track assembly 10 including a pair of elongated tracks 11 formed integrally with a trough 12 extending beneath the tracks, the assembly being mounted in launching position by structural members 13 embedded in concrete foundations 14 spaced along the length of the assembly. A carriage assembly 15 is shown in broken lines between tracks 11 and beneath the aircraft 16 which, for purposes of illustration, is shown to comprise a target drone of the type used in anti-aircraft gunnery practice.

At one end of the track assembly is positioned the hydraulic jet gun 17, together with associated equipment used in operating the gun including an air compressor 18, air pressure accumulators 19 and appropriate piping and manifolds which will be more completely described in connection with the showing of Fig. 6. Mounted on the track assembly near its opposite end is carriage braking apparatus 20 which also will be more completely described in connection with Figs. 9 and 10.

The more detailed showing of the track assembly in Figs. 2 and 3 includes the laterally spaced tracks 11 which suitably comprise structural channels for receiving and constraining rollers 21 upon which the carriage assembly 15 is suspended for movement. Channels 11 form part of an integral frame structure including side panels 22 and bottom trough 12, suitable side braces 23 being joined to the side panels and between the trough and channels at longitudinally spaced intervals along the track assembly. There is also shown a system of louvers 24 positioned immediately above the trough and angled downwardly and rearwardly for receiving water discharged from the bucket structure to be described, and passing the water into the trough.

The light weight carriage assembly 15 shown in Figs. 2 through 4 includes an elongated tube 25 having an integral jet receiving bucket 26 at its forward end, the bucket being internally shaped to receive the jet stream substantially tangentially and thereafter guide it downward and reversely for discharge through the louvers into the trough, after turning through an angle of approximately 170°. As a result, the jet thrust on the bucket is nearly double what it would otherwise be if the jet stream were merely intercepted without being reversed. The tube itself has a diameter somewhat greater than that of the jet stream indicated by arrows 27, so that the stream will not contact the sides of the tube before impinging upon the bucket interior.

Attached to rearward and forward portions of the tube 25 is carriage support structure including a ring 28 and angled brackets 29 mounting cross members 30. To the opposite lateral ends of the latter members are connected rollers 21 for suspending the carriage between and below the channeled tracks 11. The rear cross member 30 also carries a pair of laterally spaced aircraft supports 31 which may be suitably formed as forwardly opening hooks for receiving lateral projections 132 carried by the aircraft and preventing downward movement thereof relative to the carriage assembly. Rearward movement of projections 132 is only prevented by supports 31 in the event of failure of strap 36 or cables 37, to be described. The forward cross member 30 may carry a pair of laterally spaced aircraft supports 32 having channels 33 formed in their upper ends for receiving lateral projections 34 carried by the aircraft. It will be apparent from Fig. 2 that while supports 31 and 32 carry the aircraft above the carriage assembly and prevent rearward movement thereof, forward launching movement of the aircraft away from the carriage assembly is accommodated without restraint, the transverse supports 132 and 34 merely riding out of the hooked and channeled supports 31 and 32.

For purposes of transmitting thrust from the carriage assembly to the aircraft, a flexible strap 36 which may be suitably formed of steel is carried by the nose of the bucket 26, opposite ends of the strap being joined to a pair of cables 37 extending rearwardly and upwardly from the carriage assembly. Hooks 38 are conveniently carried by the ends of the cables to engage connecting members 39 received within wells 40 formed beneath the wings of the aircraft. Connecting members 39 may be conveniently withdrawn from their wells for engagement with the hooks 38 to transmit thrust directly to the aircraft during the launching run, and after disengagement of the hooks from the members 39 the latter are retracted back into their wells by compression springs 41 positioned within receptacles 42 and engaging flanges 43 at the bases of the connecting members. In order to preent forward whipping of the cables 37 upon arresting forward carriage movement after launching of the aircraft, tie lines 44 are provided to extend between hooks 38 and rearward supports 31.

Referring now to Fig. 6 of the drawings in which the equipment associated with the jet gun 17 is shown in flow sheet form, the water charging system for the jet gun includes a water reservoir 46 from which water is supplied through a filter 47 to a water storage and deaerator tank 48 by pump 49. From tank 48 water is led through line 50 to a charging pump 51 delivering to the forward end of the jet gun 52 through cut-off valve 53. In connection with water supply to reservoir 46, the trough structure 12 associated with the track assembly may be mounted to tilt rearwardly and slightly downwardly from the horizontal as shown in Fig. 2 so that water will run along the trough toward collector pipe 54 shown in Figs. 1 and 6 discharging into the reservoir.

Compressed air is supplied to the jet gun from air accumulators 19 into which air is pumped by compressor 18 through check valve 57. Cut-off valve 58 inserted in manifold 59 running between the accumulators and delivering to line 60 supplying the jet gun is also utilized to connect line 60 with salvage line 61 running to the intake of the compressor, for purposes as will appear.

Coming now to a description of the jet gun itself, it is shown in Fig. 7 to comprise a cylindrical shell 62 containing a forward water chamber 64 and an air chamber 63 into which line 60 is connected. To the forward end of the cylinder is joined a nozzle block 65 containing a nozzle-shaped orifice 66 for converting static hydraulic pressure to high velocity jet flow. The size of orifice 66 is controlled by a smoothly contoured needle valve 67 carried at the forward end of an axially movable shank 68 extending rearwardly through chamber 63 and having a spiral threaded rear portion 69. The latter is engaged by an internally threaded spur gear 70 which meshes with worm 71 driven by motor 72 at a varying speed such that needle 67 is retracted away from orifice 66 in a timed relation to launching movement of the carriage assembly. Retraction of needle 67 increases the rate of hydraulic jetting to compensate for the decreasing difference between the jet and carriage assembly velocities and thereby to maintain a substantially constant reaction against the bucket 26.

The nozzle block 65 also contains a short jet discharge conduit 73 adapted to be directed toward the carriage assembly for launching purposes. Conduit 73 is larger in diameter than orifice 66 to provide clearance for the hydraulic jet, the orifice itself being formed to shape the jet stream issuing therefrom so that the water in the jet will be desirably contained during jet travel. To promote desired shaping of the jet, air is conveniently purged from that portion of conduit 73 nearest the orifice 66 through a line 166 mounted in the nozzle block and suitably connected to an air evacuating pump, not shown.

A starting valve assembly mounted at the forward end of the nozzle block includes a gate valve 74 controlled by solenoid 75 and receivable within a transverse seat structure 76 in such manner as to prevent water flow through the nozzle when the valve is closed across passage 73. A water supply conduit 77 is also connected into the nozzle block and in communication with passage 73, water being charged into the chamber 64 through conduit 77 as controlled by valve 53 shown in Fig. 6. In order to transmit air pressure from chamber 63 to the water in chamber 64, the traveling piston 78 is mounted on shank 68 of the needle valve for movement lengthwise in cylinder 62, appropriate seals being formed between the piston, the cylinder wall and the shank 68. The broken line 79 shown near the rear of the jet gun indicates a suitable transverse pivot, such as may be formed by trunnions secured to the jet gun shell, allowing vertical swinging of the gun to adjust the trajectory of the jet stream with relation to the carriage assembly 15.

Referring now to the carriage braking apparatus generally indicated at 20 in Fig. 1, a more detailed representation of the apparatus in Figs. 9c and 10 includes two pairs of cylindrical shells 80, mounted in laterally spaced relation beneath the launching end portion of the track assembly and secured to appropriate track assembly structure 180, each cylinder containing a piston 81 in which an orifice 82 is formed communicating between liquid chambers 83 and 84. Rods 85 connect the pistons to external cross-heads 86 mounting suitable drums 87 movable with the cross-heads. Other drums 88 are secured to structural supports 13 in spaced relation to drums 87, and suitable cables 89 are wound around the drums 87 and 88 to couple them in force transmitting relation, the ends of the cables being connected to opposite ends of a transverse catching member 90 extending across the tracks 11 as shown in Fig. 1. Upon interception of catching member 90 by vertical supports 32 mounted on the carriage, the cables 89 tend to pull the cross-heads away from the cylindrical shells 80, which movement is resisted by liquid pressure exerted upon the pistons traveling within the shells, as controlled by the flow of fluid between chambers 83 and 84 through orifice 82. As a result, the carriage assembly 15 may be brought to a halt before it leaves the end of the track assembly.

A typical operating cycle during a catapulting operation may be described as follows: The aircraft 16 is first mounted on the carriage supports 31 and 32 above that portion of the track assembly located near the jet gun, the hooks 38 carried by cables 37 also being connected to the aircraft for transferring thrust thereto from the bucket 26. The jet gun 17 is then directed toward the carriage assembly so that the jet stream 27 will pass into and through tube 25 for reaction against the bucket. Meanwhile, the air chamber 63 within the gun is connected with the intake of the air compressor through line 61 and valve 58, the compressor salvaging the energy in chamber 63 represented by the high pressure air remaining therein after the previous catapulting operation. When the jet gun scavenging pressure in chamber 63 has dropped to some pre-set low value, water is charged into the chamber 64 through conduit 77 and the piston 74 moves rearward on shank 68 to battery position, and valve 53 is closed when the gun has been fully charged with water.

Air valve 58 is then adjusted to place the air accumulators 19 in communication with air chamber 63 through lines 59 and 60, a typical working pressure being 3500 pounds per square inch. While maintaining the working pressure in chamber 63, the starting valve is suddenly opened at the time that aircraft launching is desired, with the result that piston 78 is urged toward the nozzle transmitting the high pressure to the water in chamber 64 which flows from the nozzle at extremely high velocities and toward the carriage assembly.

Various positions of the aircraft and carriage assembly during launching are illustrated in Figs. 9a, 9b and 9c. In Fig. 9a the aircraft is shown at the beginning of launching, while in Fig. 9b it is shown in running position at an intermediate point on the launching track assembly. Constant thrust or reaction against the bucket 26 is controlled by backing needle valve 67 away from the orifice 66 as described above, with the result that the aircraft and carriage assembly accelerates substantially uniformly to launching velocity. Before the carriage assembly reaches the braking system, the starting valve in the jet gun is closed to cut off the jet stream, so that hydraulic jetting against the bucket terminates before the moving carriage assembly is halted. In Fig. 9c the aircraft is shown a moment after leaving the launching track assembly, with the carriage assembly having been intercepted by the braking apparatus as previously described.

A typical catapult of the type described may be constructed for launching a 2000 pound drone to a flight speed of 160 knots with a launching run of approximately 115 feet, while maintaining substantially constant acceleration at 10 g. units. Furthermore, the catapult is capable of repeated launchings at the rate of around one aircraft per minute. The jet thrust developed by a jet gun of the type described may, of course, vary with the design and with the launching run desired before take off. A thrust of 20,000 pounds is readily developed to secure launching of the 2000 pound drone, the jet stream having a velocity high enough to describe an almost linear trajectory over the 115 foot launching run.

I claim:

1. In hydraulic catapulting apparatus for aircraft comprising elongated guide means including a track for guiding launching movement of an aircraft prior to becoming airborne, the combination with said apparatus of a movable carriage engaging said track for guided movement in the launching direction, means carried by said carriage and connectible with said aircraft for directly transferring launching thrust thereto, a hydraulic impulse bucket supported by said carriage, and a variable discharge hydraulic jet gun including a nozzle directed in alignment with the path of bucket travel and toward said bucket for variably jetting a high velocity liquid stream thereagainst with increasing jet discharge during launching to impel said carriage in said launching direction, said gun being supported independently of the carriage.

2. In hydraulic catapulting apparatus for aircraft comprising elongated guide means including a track for guiding launching movement of an aircraft prior to becoming airborne, the combination with said apparatus of a movable carriage engaging said track for guided movement in the launching direction, and means carried by said carriage and releasably connectible with said aircraft for directly transferring launching thrust thereto, a hydraulic impulse bucket supported by said carriage and extending therebelow for downwardly discharging received liquid in the vertical plane of bucket and carriage travel, and a variable discharge hydraulic jet gun including a nozzle directed in alignment with the path of bucket travel and toward said bucket for variably jetting a high velocity liquid stream thereagainst with increasing jet discharge during launching to impel said carriage in said launching direction, said gun being supported independently of the carriage.

3. In hydraulic catapulting apparatus for aircraft comprising elongated guide means including a track for guiding launching movement of an aircraft prior to becoming airborne, the combination with said apparatus of a movable carriage engaging said track for guided movement in the launching direction, means carried by said carriage and connectible with said aircraft for directly transferring launching thrust thereto, a hydraulic impulse bucket supported by said carriage, a hydraulic jet gun including a variable discharge nozzle directed in alignment with the path of bucket travel and toward said bucket for variably jetting a high velocity liquid stream thereagainst impelling said carriage in said launching direction, and means controlling said nozzle and operable during liquid jetting to increase the nozzle opening so as to increase the rate of liquid jetting therefrom to maintain a substantially constant hydraulic thrust against said bucket, said gun being supported independently of the carriage.

4. In hydraulic catapulting apparatus for aircraft comprising an elongated track assembly including a track for guiding launching movement of an aircraft prior to becoming airborne, the combination with said apparatus of a movable carriage assembly including carriage supports engaging said track and constrained thereby for guiding movement of said carriage in the launching direction and a support upon which said aircraft is adapted to be carried during launching thereof, means carried by said carriage and connectible with said aircraft for transferring launching thrust thereto, a hydraulic impulse bucket supported by said carriage and extending therebelow for downwardly discharging received liquid in the vertical plane of bucket and carriage travel, and a hydraulic jet gun assembly including a variable discharge nozzle directed in alignment with the path of bucket travel and toward said bucket for variably jetting a high velocity stream of liquid thereagainst impelling said carriage in said launching direction, and means controlling said nozzle and operable during liquid jetting to increase the nozzle opening so as to increase the rate of liquid jetting therefrom as the bucket travels away from the nozzle to maintain a substantially constant hydraulic thrust against said bucket, said gun being supported independently of the carriage.

5. The invention as defined in claim 4 in which said gun assembly includes a separate starting valve closing said nozzle and movable out of nozzle closing position to initiate said jetting.

6. The invention as defined in claim 5 comprising a needle valve controlling the discharge area of said nozzle and a needle valve actuator operable during hydraulic jetting to continuously displace the needle valve relative to said nozzle so as to increase said area.

7. The invention as defined in claim 6 in which said jet gun comprises a cylinder containing a chamber in communication with said nozzle and into which liquid is chargeable, a pressure chamber into which pressurized gas is admissible, and a piston separating said chambers and movable within said cylinder relative to the needle valve by said pressurized gas to force liquid from said nozzle when said starting valve is opened.

8. The invention as defined in claim 4 in which said carriage assembly comprises an elongated tube for axially receiving and confining said hydraulic jet below the aircraft, and in which said bucket is carried at the forward end of the tube.

9. The invention as defined in claim 8 in which said means connectible with said aircraft comprises a cable attachable to said aircraft and a connection between said cable and said bucket.

10. The invention as defined in claim 8 including a pair of laterally spaced elongated tracks suspending said carriage with the tube and bucket in a vertical plane between the tracks.

11. The invention as defined in claim 10 including a trough in said plane extending below the path of bucket travel for receiving liquid discharged from said bucket.

12. The invention as defined in claim 10 including a catch mounted on the tracks to intercept said carriage during launching, and a brake mechanism operatively connected with the catch to resist displacement thereof.

13. The method of hydraulically catapulting an aircraft, that includes directing a single high velocity hydraulic jet in the direction of aircraft launching and in thrust transferring relation with the aircraft, and increasing the size of the jet as the aircraft moves away from the jet source in the launching direction and in timed relation to increasing aircraft velocity during launching to maintain said thrust relation at a substantially constant value during launching.

14. The method of hydraulically catapulting an aircraft, that includes directing a single high velocity hydraulic jet substantially parallel with the direction of aircraft launching and in thrust transferring relation with aircraft launching means, and continuously progressively increasing the jet size as the aircraft launching velocity increases and in timed relation to increasing aircraft velocity during launching to maintain said thrust relation at a substantially constant value during launching.

References Cited in the file of this patent
UNITED STATES PATENTS

| | | |
|---|---|---|
| 2,026,046 | Krannak | Dec. 31, 1935 |
| 2,291,453 | Deglon | July 28, 1942 |
| 2,292,374 | Hagenbuch | Aug. 11, 1942 |
| 2,493,014 | Nelson | Jan. 3, 1950 |
| 2,514,406 | Maxson | July 11, 1950 |
| 2,703,112 | Fuchs | Mar. 1, 1955 |
| 2,737,357 | Ringleb | Mar. 6, 1956 |